United States Patent
Shieh et al.

(10) Patent No.: US 10,260,870 B2
(45) Date of Patent: Apr. 16, 2019

(54) ON-LINE MEASURING SYSTEM, DATUM CALIBRATING METHOD, DEVIATION MEASURING METHOD AND COMPUTER-READABLE MEDIUM

(71) Applicant: INDUSTRIAL TECHNOLOGY RESEARCH INSTITUTE, Hsinchu (TW)

(72) Inventors: Po-Huang Shieh, Zhunan Township, Miaoli County (TW); Po-Nien Tsou, Tainan (TW); Wei-Chieh Chang, Tainan (TW); Ming-Cheng Tsai, New Taipei (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 0 days.

(21) Appl. No.: 15/855,794

(22) Filed: Dec. 27, 2017

(65) Prior Publication Data
US 2019/0086199 A1    Mar. 21, 2019

(30) Foreign Application Priority Data
Sep. 19, 2017   (TW) .............................. 106132090 A

(51) Int. Cl.
G01B 11/24    (2006.01)
G01B 11/25    (2006.01)
G01B 11/02    (2006.01)

(52) U.S. Cl.
CPC .......... *G01B 11/2518* (2013.01); *G01B 11/02* (2013.01); *G01B 2210/56* (2013.01)

(58) Field of Classification Search
CPC ....... G06T 7/0057; G01B 11/24; G01B 11/25; G01B 11/306; G01B 11/245
(Continued)

(56) References Cited

U.S. PATENT DOCUMENTS 6,944,564 B2   9/2005 De Jonge et al.
7,015,473 B2   3/2006 Harding et al.
(Continued)

FOREIGN PATENT DOCUMENTS

CN   106023156 A   10/2016
CN   106248035 A   12/2016
(Continued)

OTHER PUBLICATIONS

S. Sclaroff and A. P. Pentland, "Modal matching for correspondence and recognition," in *IEEE Transactions on Pattern Analysis and Machine Intelligence*, vol. 17, No. 6, Jun. 1995, pp. 545-561.
(Continued)

*Primary Examiner* — Md M Rahman
(74) *Attorney, Agent, or Firm* — Muncy, Geissler, Olds & Lowe, P.C.

(57) ABSTRACT

An on-line measuring system, a datum calibrating method, a deviation measuring method and a computer-readable medium are provided. The datum calibrating method includes following steps. A work piece is scanned by a scanning unit to obtain a global point cloud data. A local CAD data of the work piece is obtained according to a predetermined range. A local CAD geometric feature of the local CAD data is obtained. A local point cloud data of the global point cloud data is obtained according to a local range corresponding to the predetermined range. A local scanning geometric feature of the local point cloud data is obtained. The local scanning geometric feature and the local CAD geometric feature are compared to obtain at least one spatial freedom limit. A system basis is obtained according to six spatial freedom limits, if the number of the at least one spatial freedom limit reaches six.

19 Claims, 6 Drawing Sheets

(58) Field of Classification Search
USPC .......................................................... 356/601
See application file for complete search history.

(56) References Cited

U.S. PATENT DOCUMENTS

| | | | |
|---|---|---|---|
| 8,903,576 B2 | 12/2014 | Tink | |
| 9,014,999 B2 | 4/2015 | Turbell et al. | |
| 9,245,062 B2 | 1/2016 | Rueb | |
| 2007/0242894 A1* | 10/2007 | Kautzer | H04N 19/46 |
| | | | 382/243 |
| 2011/0288806 A1 | 11/2011 | Turbell et al. | |
| 2014/0157610 A1 | 6/2014 | Garvey et al. | |
| 2016/0292533 A1 | 10/2016 | Uchiyama et al. | |
| 2016/0300003 A1* | 10/2016 | Knoll | G06F 17/5018 |
| 2017/0082521 A1 | 3/2017 | May et al. | |

FOREIGN PATENT DOCUMENTS

| | | |
|---|---|---|
| TW | I313346 B | 8/2009 |
| TW | I434021 B | 4/2014 |
| TW | I537110 B | 6/2016 |

OTHER PUBLICATIONS

Xiu-Lan Wen et al., "Flatness error evaluation and verification based on new generation geometrical product specification (GPS)" Precision Engineering 36 (2012), pp. 70-76.

P. J. Besl and N. D. McKay, "A method for registration of 3-D shapes," in *IEEE Transactions on Pattern Analysis and Machine Intelligence*, vol. 14, No. 2, Feb. 1992, pp. 239-256.

B. Amberg, S. Romdhani and T. Vetter, "Optimal Step Nonrigid ICP Algorithms for Surface Registration," 2007 IEEE Conference on Computer Vision and Pattern Recognition, Minneapolis, MN, 2007, pp. 1-8.

D. Holz, A. E. Ichim, F. Tombari, R. B. Rusu and S. Behnke, "Registration with the Point Cloud Library: A Modular Framework for Aligning in 3-D," in *IEEE Robotics & Automation Magazine*, vol. 22, No. 4, Dec. 2015, pp. 110-124.

A. Nurunnabi, D. Belton and G. West, "Robust Segmentation for Large Volumes of Laser Scanning Three-Dimensional Point Cloud Data," in *IEEE Transactions on Geoscience and Remote Sensing*, vol. 54, No. 8, Aug. 2016, pp. 4790-4805.

\* cited by examiner

ON-LINE MEASURING SYSTEM, DATUM CALIBRATING METHOD, DEVIATION MEASURING METHOD AND COMPUTER-READABLE MEDIUM

This application claims the benefit of Taiwan application Serial No. 106132090, filed Sep. 19, 2017, the disclosure of which is incorporated by reference herein in its entirety.

TECHNICAL FIELD

The disclosure relates in general to an on-line measuring system, a datum calibrating method, a deviation measuring method and a computer-readable medium.

BACKGROUND

After a traditional machining machine performs a machining process on a work piece, the measurement of the work piece is performed by moving the work piece to a measuring system. This measurement may affect the production line and is not suitable for some large work piece.

For performing the measurement on line, a particular machining machine integrated with a measuring system is needed. The work piece can be performed the machining process and the measurement on this machining machine without moving. However, the coordinates of this measuring system and this machining machine are calibrated before shipping, and this measuring system is only applicable for this machining machine.

Moreover, if a machining machine is not integrated with any measuring system, it cannot be calibrated on line.

Therefore, it is a goal to develop a datum calibrating method and a deviation measuring method for a measuring system to be applicable for any machining machine.

SUMMARY

The disclosure is directed to an on-line measuring system, a datum calibrating method, a deviation measuring method and a computer-readable medium.

According to one embodiment, an on-line measuring system is provided. The on-line measuring system includes a scanning unit, a CAD processing unit, a point cloud data processing unit, a degree of freedom processing unit (DOF processing unit) and a basis setting unit. The scanning unit includes a laser emitter and a laser receiver. The laser emitter is used for continuously scanning a work piece. The laser receiver is used for receiving a reflection data reflected from the work piece to obtain a global point cloud data. The CAD processing unit is used for capturing a local CAD data of the work piece according to a predetermined range, and obtaining a local CAD geometric feature of the local CAD data. The point cloud data processing unit is used for capturing a local point cloud data from the global point cloud data according to a corresponding range corresponding to the predetermined rage, obtaining a local scanning geometric feature of the local point cloud data. The degree of freedom processing unit (DOF processing unit) is used for comparing the local CAD geometric feature and the local scanning geometric feature to obtain at least one degree of freedom (DOF), and determining whether the number of the at least one DOF reaches six. The basis setting unit is used for setting a system basis according to the DOFs, if the number of the DOFs reaches six.

According to another embodiment, a datum calibrating method of an on-line measuring system is provided. The datum calibrating method includes the following steps. A work piece is continuously scanned by a scanning unit to obtain a global point cloud data. A local CAD data of the work piece captured according to a predetermined range. A local CAD geometric feature of the local CAD data is obtained. A local point cloud data is captured from the global point cloud data according to a corresponding range corresponding to the predetermined rage. A local scanning geometric feature of the local point cloud data is obtained. The local CAD geometric feature and the local scanning geometric feature are compared to obtain at least one degree of freedom (DOF). Whether the number of the at least one DOF reaches six is determined. A system basis is set according to the DOFs, if the number of the DOFs reaches six.

According to alternative embodiment, a deviation measuring method of an on-line measuring system is provided. The deviation measuring method includes the following steps. A target CAD geometric feature of a target area of a work piece is obtained according to a system basis. A corresponding area of the work piece corresponding to the target area is scanned by a scanning unit. A target point cloud data of the corresponding area is obtained by the scanning unit. A geometric deviation between the target point cloud data and the target CAD geometric feature is calculated according to a search algorithm.

According to another embodiment, a non-transitory computer-readable medium used for storing a program is provided. After a computer loads the program, the computer performs a datum calibrating method of the on-line measuring system. The datum calibrating method includes the following steps. A work piece is continuously scanned by a scanning unit to obtain a global point cloud data. A local CAD data of the work piece captured according to a predetermined range. A local CAD geometric feature of the local CAD data is obtained. A local point cloud data is captured from the global point cloud data according to a corresponding range corresponding to the predetermined rage. A local scanning geometric feature of the local point cloud data is obtained. The local CAD geometric feature and the local scanning geometric feature are compared to obtain at least one degree of freedom (DOF). Whether the number of the at least one DOF reaches six is determined. A system basis is set according to the DOFs, if the number of the DOFs reaches six.

According to alternative embodiment, a non-transitory computer-readable medium used for storing a program is provided. After a computer loads the program, the computer performs a deviation measuring method of the on-line measuring system. The deviation measuring method includes the following steps. A target CAD geometric feature of a target area of a work piece is obtained according to a system basis. A corresponding area of the work piece corresponding to the target area is scanned by a scanning unit. A target point cloud data of the corresponding area is obtained by the scanning unit. A geometric deviation between the target point cloud data and the target CAD geometric feature is calculated according to a search algorithm.

Figure 1:
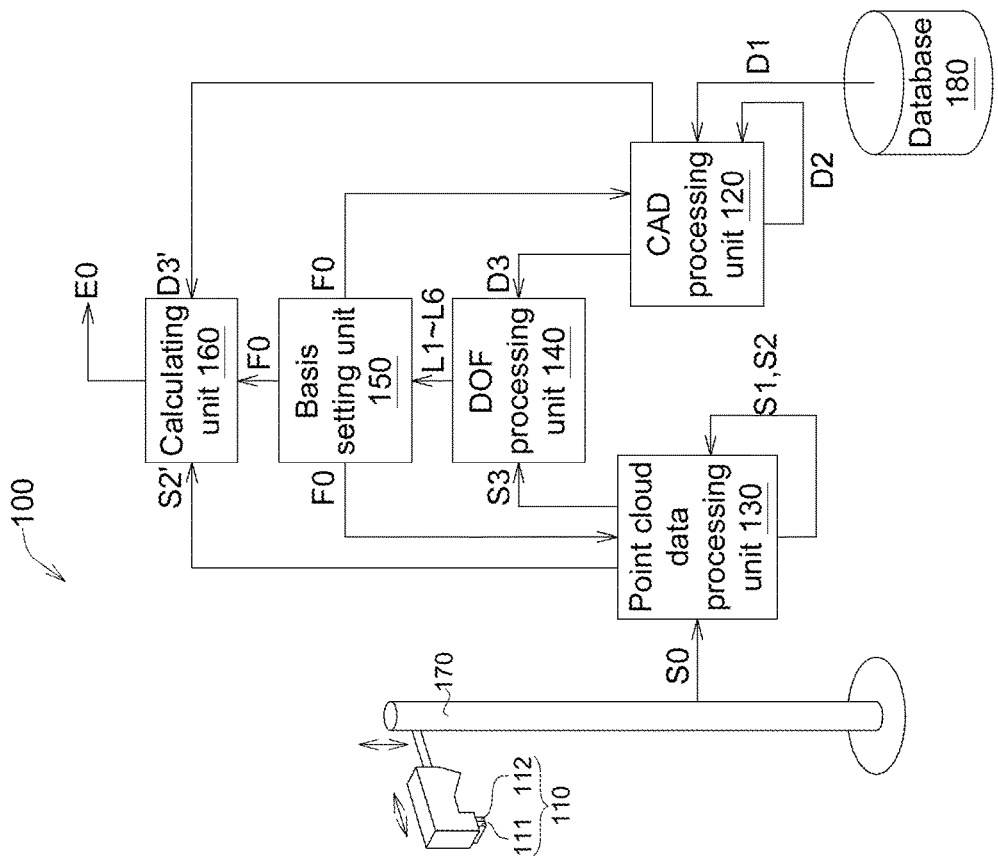
FIG. 1 shows an on-line measuring system according to one embodiment is shown.
Figure 1:
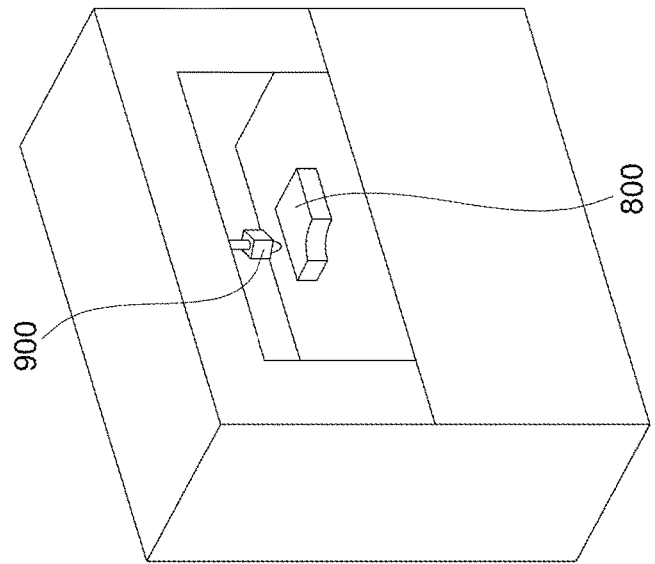

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, an on-line measuring system 100 according to one embodiment is shown. A machining machine 900 is used for performing machining process on a work piece 800. After performing the machining process by the machining machine 900, the on-line measuring system 100 is moved to the machining machine 900, and performs an on-line measurement on the work piece 800. The on-line measuring system 100 is not fixed at the machining machine 900. In the present embodiment, even if the on-line measuring system 100 is not fixed at the machining machine 900, the datum calibrating method can be performed on the work piece 800 to perform a deviation measuring method on-line.

As shown in FIG. 1, the on-line measuring system 100 includes a scanning unit 110, a CAD processing unit 120, a point cloud data processing unit 130, a degree of freedom processing unit (DOF processing unit) 140, a basis setting unit 150, a calculating unit 160, a moving assembly 170 and a database 180.

The scanning unit 110 includes a laser emitter 111 and a laser receiver 112. The laser emitter 111 is used for emitting a laser for scanning the work piece 800. The laser receiver 112 is used for receives a reflection data reflected from the work piece 800, for creating a point cloud data. The CAD processing unit 120 and the point cloud data processing unit 130 are used for processing the CAD data and the point cloud data respectively. The DOF processing unit 140 is used for processing the degree of freedom (DOF). The basis setting unit 150 is used for setting the system basis. The calculating unit 160 is used for performing various calculating processes. The CAD processing unit 120, the point cloud data processing unit 130, the DOF processing unit 140, the basis setting unit 150 and the calculating unit 160 may be a circuit, a chip, a circuit board or a non-transitory computer-readable medium storing a plurality of program codes. The moving assembly 170 is used for moving the scanning unit 110. For example, the moving assembly 170, may be a robot arm, a self-propelled device. The database 180 is used for storing various data. For example, the database 180 may be a memory, a hard disk or a cloud data center.

Because the on-line measuring system 100 is not fixed at the machining machine 900, a datum calibrating method is needed to be performed before performing the deviation measuring method. The following flowcharts are used to illustrate the datum calibrating method and the deviation measuring method.

Figure 2:
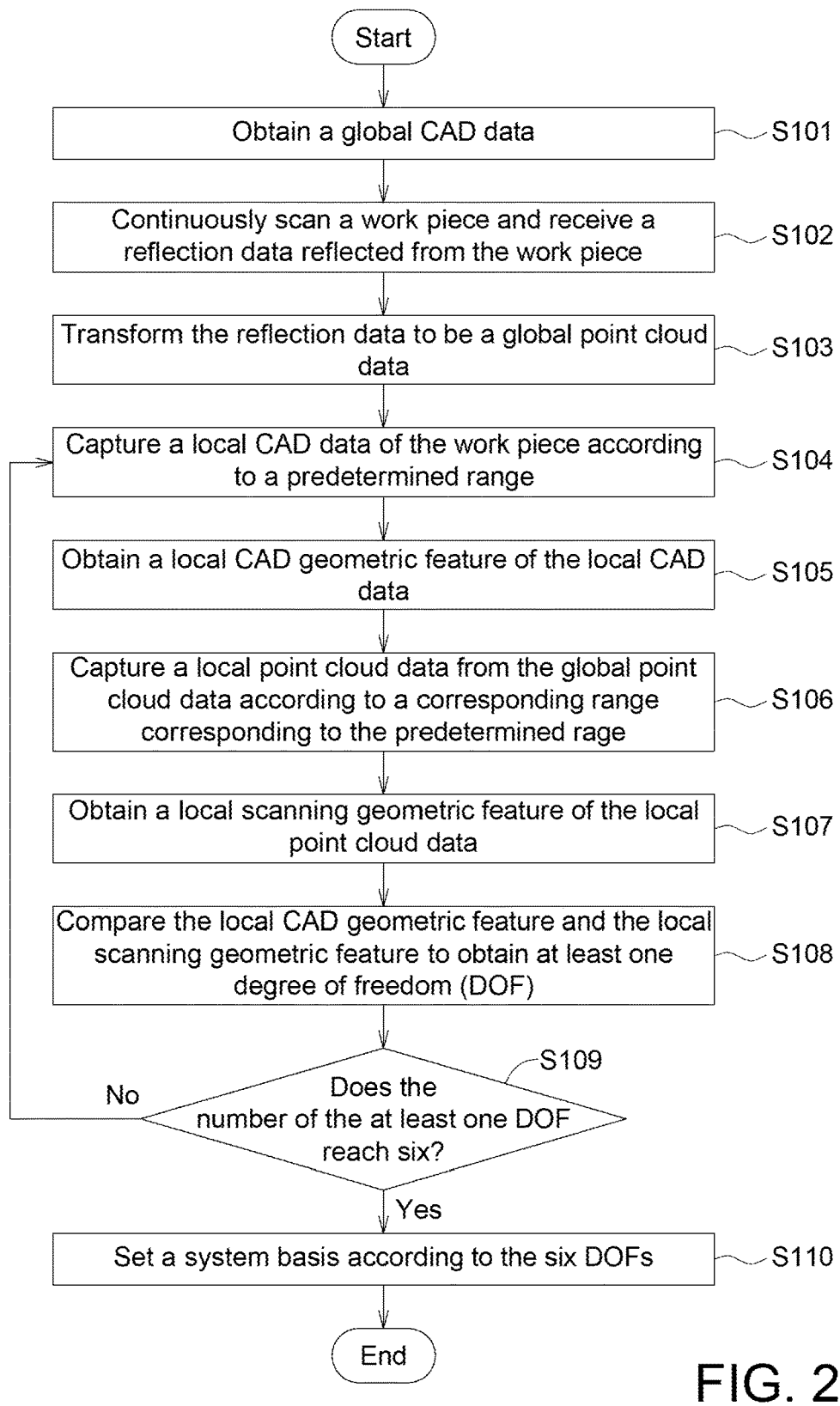
FIG. 2 shows a flowchart of the datum calibrating method of the on-line measuring system according to one embodiment.
Figure 3:
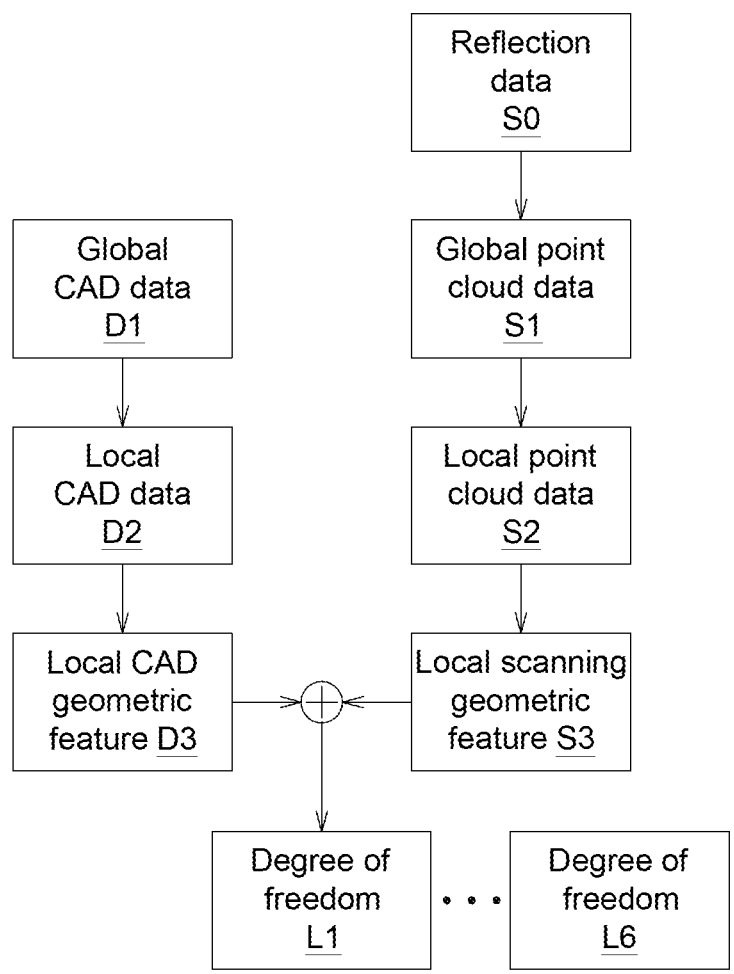
FIG. 3 shows the transform of the data in FIG. 2.
Figure 4:
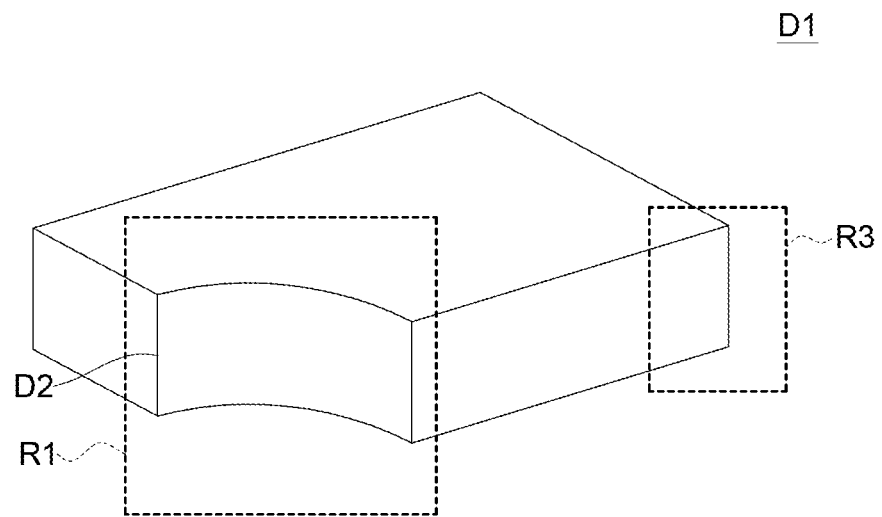
FIG. 4 shows a global CAD data according to one embodiment.

Please refer to FIGS. 2 to 3. FIG. 2 shows a flowchart of the datum calibrating method of the on-line measuring system 100 according to one embodiment. FIG. 3 shows the transform of the data in FIG. 2. The datum calibrating method can be implemented by hardware or software. For example, in one embodiment, the steps of the datum calibrating method can be implemented by circuits. Or, in another embodiment, the steps of the datum calibrating method can be implemented by loading program codes in a computer-readable medium, such as optical disk or cloud data center. First, in step S101, the CAD processing unit 120 obtains a global CAD data D1 from the database 180. Please refer to FIG. 4. FIG. 4 shows the global CAD data D1 according to one embodiment. The global CAD data D1 is the three-dimensional structure of the work piece 800 which is drawn by a designer. The global CAD data D1 includes a full view information.

Figure 5:
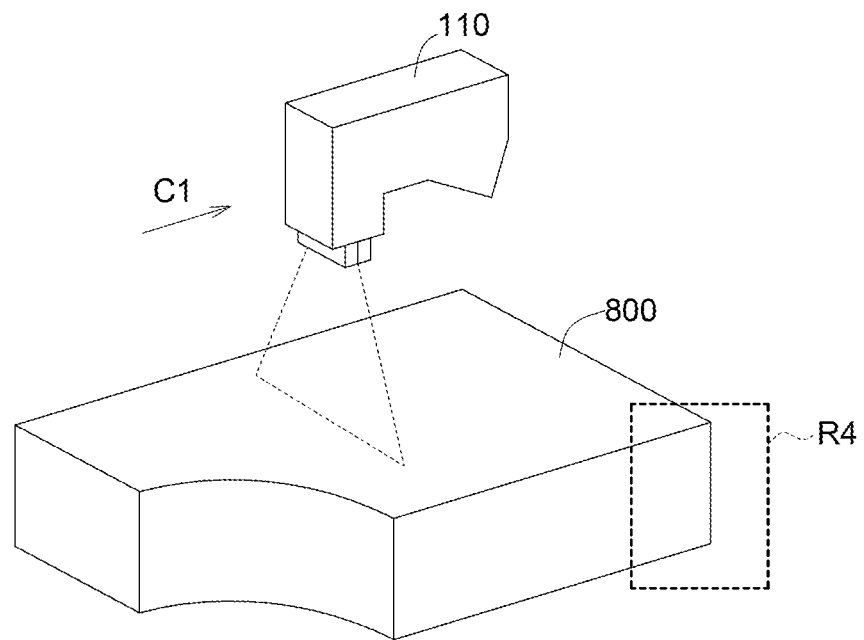
FIG. 5 shows that a scanning unit scans a work piece.

Next, in the step S102, the laser emitter 111 of the scanning unit 110 continuously scans the work piece 800 and the laser receiver 112 receives a reflection data S0 reflected from the work piece 800. Please refer to FIG. 5. FIG. 5 shows that the scanning unit 110 scans the work piece 800. In one embodiment, the scanning unit 110 provides a linear laser to scan along a straight line direction C1 and obtains the reflection data S0. The reflection data S0 represents the outline of the work piece 800. In one embodiment, the scanning unit 110 can scan along several directions to construct a complete structure of the work piece 800.

Figure 6:
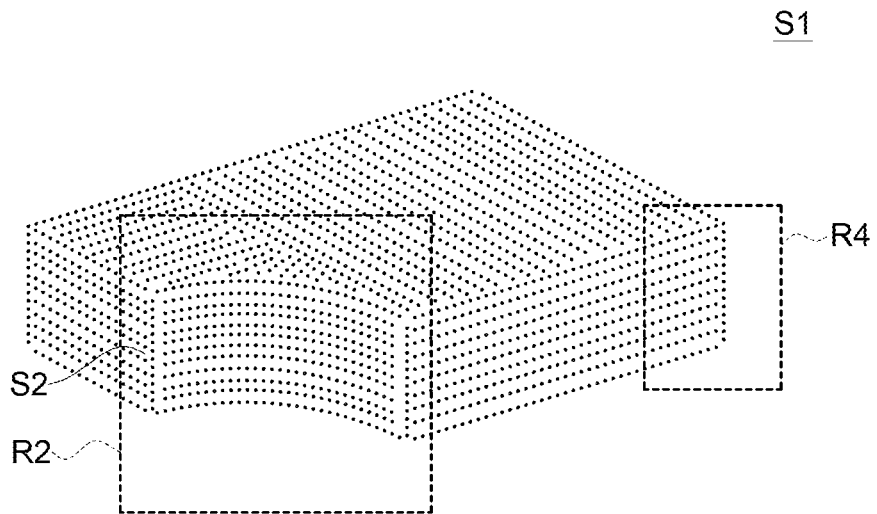
FIG. 6 shows a global point cloud data.

Then, in step S103, the point cloud data processing unit 130 transforms the reflection data S0 to be a global point cloud data S1. Please refer to FIG. 6. FIG. 6 shows the global point cloud data S1. The global point cloud data S1 is a 3D point cloud data which represents the machining result of the work piece 800. At this time, the system basis of the global point cloud data S1 and the system basis of the global CAD data D1 are not created yet, so the machining result of the work piece 800 cannot be determined according to the global point cloud data S1.

Afterwards, in step S104, the CAD processing unit 120 captures a local CAD data D2 of the work piece 800 from the global CAD data D1 according to a predetermined range R1 (shown in FIG. 4). As shown in FIG. 4, the local CAD data D2 is a notch of the global CAD data D1. In general, one portion which is obviously changed in several DOFs can be selected to be the local CAD data D2.

Next, in step S105, the CAD processing unit 120 obtains a local CAD geometric feature D3 of the local CAD data D2. For example, the local CAD geometric feature D3 may includes a flat plane equation, a curved surface equation, a length, a width, a normal line and an angle.

Then, in step S106, the point cloud data processing unit 130 captures a local point cloud data S2 from the global point cloud data S1 according to a corresponding range R2 (shown in FIG. 6) corresponding to the predetermined rage R1. In this step, the system basis of the global point cloud data S1 and the system basis of the global CAD data D1 are not set. The predetermined range R1 is the notch of the global CAD data D1, so the point cloud data processing unit 130 creates the corresponding range R2 corresponding to the notch of the global point cloud data S1, and obtains the local point cloud data S2.

Afterwards, in step S107, the point cloud data processing unit 130 obtains a local scanning geometric feature S3 of the local point cloud data S2. For example, the local scanning geometric feature S3 may include a flat plane equation, a curved surface equation, a length, a width, a normal line and an angle.

Next, in step S108, the DOF processing unit 140 compares the local CAD geometric feature D3 and the local scanning geometric feature S3 to obtain at least one degree of freedom (DOF), such as the DOF L1.

Then, in step S109, the DOF processing unit 140 determines whether the number of the at least one DOF reaches six. For example, six DOFs L1 to L6 includes X-axis movement DOF, Y-axis movement DOF, Z-axis movement DOF, X-axis rotation DOF, Y-axis rotation DOF, Z-axis rotation DOF. If six DOFs L1 to L6 are obtained and the number of the DOFs reaches six, then the process proceeds to the step S110; if any of the six DOFs L1 to L6 is not obtained and the number of the DOFs does not reach six, then the process returns to steps S104 to S108.

In step S110, the basis setting unit 150 sets a system basis F0 according to the six DOFs L1 to L6.

As such, according to the datum calibrating method, even if the on-line measuring system 100 is not fixed at the machining machine 900, the datum calibrating method can be performed on the work piece 800. If the on-line measuring system 100 moves to another machining machine (not shown), the datum calibrating method can be performed also, so the on-line measuring system 100 is applicable for any machining machine.

Figure 7:
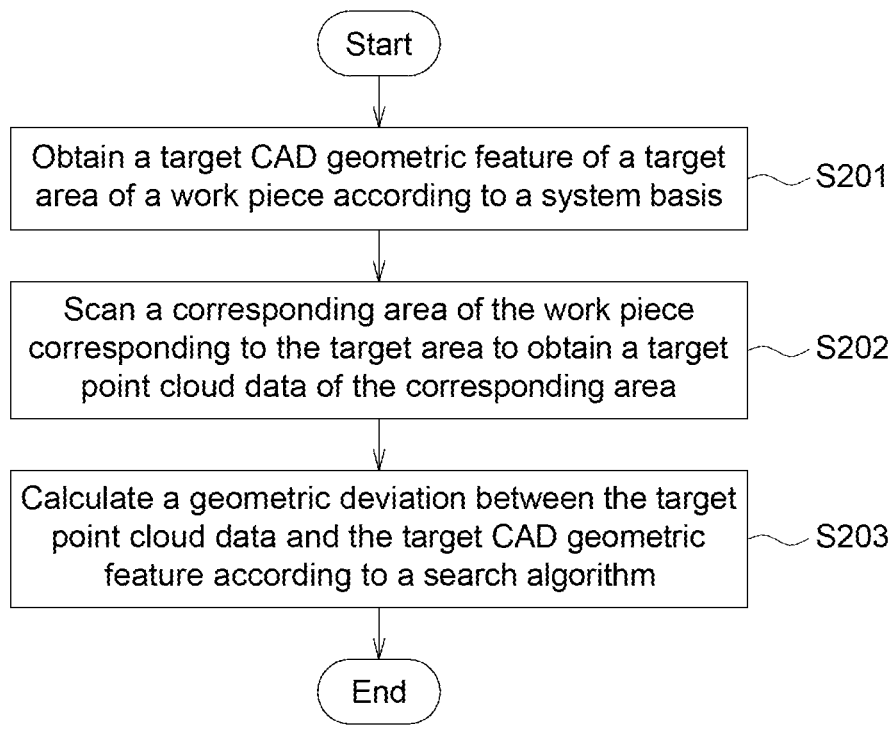
FIG. 7 shows a flowchart of a deviation measuring method of the on-line measuring system according to one embodiment.
Figure 8:
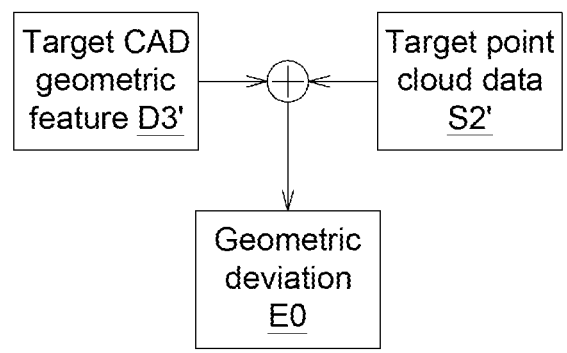
FIG. 8 shows the transform of the data in FIG. 7.

Please refer to FIGS. 7 and 8. FIG. 7 shows a flowchart of a deviation measuring method of the on-line measuring system 100 according to one embodiment. FIG. 8 shows the transform of the data in FIG. 7. After setting the system basis F0, the on-line measuring system 100 can perform the deviation measurement on the work piece 800. In one embodiment, the machining machine 900 may be one stage of a continuous production line. Several work pieces 800 may be sequentially machined at the machining machine 900. After setting the system basis F0, the system basis F0 can be used for different work pieces 800. The deviation measuring method is illustrated via the work piece 800 of FIG. 1. The deviation measuring method can be implemented by hardware or software. For example, in one embodiment, the steps of the deviation measuring method can be implemented by circuits or devices. Or, in another embodiment, the deviation measuring method by loading program codes in a computer-readable medium, such as optical disk or cloud data center.

First, in step S201, the CAD processing unit 120 obtains a target CAD geometric feature D3' of a target area R3 (shown in FIG. 4) of the work piece 800 according to the system basis F0. As shown in FIG. 4, the target area R3 may be the lower right corner of the global CAD data D1.

Next, in step S202, the scanning unit 110 scans a corresponding area R4 (shown in FIG. 5) of the work piece 800 corresponding to the target area R3 according to the system basis F0. As shown in FIG. 5, the corresponding area R4 may be the lower right corner of the work piece 800. And, the point cloud data processing unit 130 obtains a target point cloud data S2' of the corresponding area R4 (shown in FIG. 6). As shown in FIG. 6, the corresponding area R4 may be the lower right corner of the global point cloud data S1.

Then, in step S203, the calculating unit 160 calculates a geometric deviation E0 between the target point cloud data S2' and the target CAD geometric feature D3' according to a search algorithm, such as an octree algorithm, kdTree algorithm. The geometric deviation E0 can be used to know the machining result of the work piece 800.

As such, even if the on-line measuring system 100 is not fixed at the machining machine 900, the datum calibrating method can be performed on the work piece 800 on line according to the system basis F0 which is obtained on line.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An on-line measuring system, comprising:
 a detector, comprising:
  a laser emitter used for continuously scanning a work piece; and
  a laser receiver used for receiving a reflection data reflected from the work piece to obtain a global point cloud data;
 a Computer Aided Design (CAD) processing controller used for capturing a local CAD data of the work piece according to a predetermined range, and obtaining a local CAD geometric feature of the local CAD data;
 a point cloud data processing controller used for capturing a local point cloud data from the global point cloud data according to a corresponding range corresponding to the predetermined rage, and obtaining a local scanning geometric feature of the local point cloud data;
 a degree of freedom processing controller (DOF processing controller) used for comparing the local CAD geometric feature and the local scanning geometric feature to obtain at least one degree of freedom (DOF), and determining whether the number of the at least one DOF reaches six; and
 a basis setting controller used for setting a system basis according to the DOFs, wherein the number of the DOFs reaches six.

2. The on-line measuring system according to claim 1, wherein
 the CAD processing controller is further used for obtaining a target CAD geometric feature of a target area of the work piece according to the system basis;
 the detector is further used for scanning a corresponding area of the work piece corresponding to the target area according to the system basis, such that the point cloud data processing controller obtains a target point cloud data of the corresponding area; and
 a calculating controller, used for calculating a geometric deviation between the target point cloud data and the target CAD geometric feature according to a search algorithm.

3. The on-line measuring system according to claim 1, wherein the work piece is disposed on a machining machine.

4. The on-line measuring system according to claim 3, wherein the work piece is fixed at a particular position.

5. The on-line measuring system according to claim 3, wherein the detector and the machining machine are separated.

6. The on-line measuring system according to claim 1, wherein the predetermined range and the corresponding range correspond to an identical portion of the work piece.

7. A datum calibrating method of an on-line measuring system, comprising:
 continuously scanning, by a detector, a work piece to obtain a global point cloud data;
 capturing a local Computer Aided Design (CAD) data of the work piece according to a predetermined range;
 obtaining a local CAD geometric feature of the local CAD data;
 capturing a local point cloud data from the global point cloud data according to a corresponding range corresponding to the predetermined rage;

obtaining a local scanning geometric feature of the local point cloud data;

comparing the local CAD geometric feature and the local scanning geometric feature to obtain at least one degree of freedom (DOF);

determining whether the number of the at least one DOF reaches six; and setting a system basis according to the DOFs, wherein the number of the DOFs reaches six.

8. The datum calibrating method of the on-line measuring system according to claim 7, wherein the work piece is disposed on a machining machine.

9. The datum calibrating method of the on-line measuring system according to claim 8, wherein the work piece is fixed at a particular position.

10. The datum calibrating method of the on-line measuring system according to claim 8, wherein the detector and the machining machine are separated.

11. The datum calibrating method of the on-line measuring system according to claim 7, wherein the predetermined range and the corresponding range correspond to an identical portion of the work piece.

12. A non-transitory computer-readable medium, used for storing a program, wherein after a computer loads the program, the computer performs the datum calibrating method of the on-line measuring system according to claim 7.

13. A deviation measuring method of an on-line measuring system, comprising:

capturing, by a Computer Aided Design (CAD) processing controller, a local CAD data of the work piece according to a predetermined range, and obtaining a local CAD geometric feature of the local CAD data;

capturing, by a point cloud data processing controller, a local point cloud data from a global point cloud data according to a corresponding range corresponding to the predetermined rage, and obtaining a local scanning geometric feature of the local point cloud data;

obtaining a target CAD geometric feature of a target area of a work piece according to a system basis, wherein the system basis is set according to six degree of freedoms (DOFs), each of which is obtained by comparing a local CAD geometric feature and a local scanning geometric feature to obtain at least one degree of freedom (DOF);

scanning, by a detector, a corresponding area of the work piece corresponding to the target area, and obtaining, by the detector, a target point cloud data of the corresponding area; and calculating a geometric deviation between the target point cloud data and the target CAD geometric feature according to a search algorithm.

14. The deviation measuring method of the on-line measuring system according to claim 13, wherein the work piece is disposed on a machining machine.

15. The deviation measuring method of the on-line measuring system according to claim 14, wherein the work piece is fixed at a particular position.

16. The deviation measuring method of the on-line measuring system according to claim 14, wherein the detector and the machining machine are separated.

17. The deviation measuring method of the on-line measuring system according to claim 13, wherein the predetermined range and the corresponding range correspond to an identical portion of the work piece.

18. The deviation measuring method of the on-line measuring system according to claim 13, wherein the search algorithm is an octree algorithm, or a kdTree algorithm.

19. A non-transitory computer-readable medium, used for storing a program, wherein after a computer loads the program, the computer performs the deviation measuring method of the on-line measuring system according to claim 13.

* * * * *